United States Patent [19]

Dirksen

[11] Patent Number: 4,991,386
[45] Date of Patent: Feb. 12, 1991

[54] COMBINATION LEAF CADDY AND PICKUP TOOL

[76] Inventor: Ole A. Dirksen, 1104 Pleasant La., Spencer, Iowa 51301

[21] Appl. No.: 45,309

[22] Filed: May 4, 1987

[51] Int. Cl.$^5$ .............................................. A01D 7/06
[52] U.S. Cl. ................................. 56/400.12; 56/400.11
[58] Field of Search ........... 56/400.12, 400.04, 400.16, 56/400.19, 400.11, 400.2, 400.01

[56] References Cited

U.S. PATENT DOCUMENTS

| | | | |
|---|---|---|---|
| 757,123 | 4/1904 | Kampfe | 56/400.05 |
| 994,796 | 6/1911 | Stout | 56/400.11 |
| 1,588,927 | 6/1926 | Willis | 56/400.12 |
| 1,761,503 | 6/1930 | Tonhardt | 294/50.8 |
| 1,895,214 | 1/1933 | Stork | 294/50.8 |
| 1,927,873 | 9/1933 | Lantz | 56/400.16 |
| 2,065,830 | 12/1936 | Sherman | 56/400.11 |
| 2,644,455 | 7/1953 | Benoit | 128/321 |
| 2,735,712 | 2/1956 | Hart | 294/50.5 |
| 2,908,131 | 10/1959 | Ross | 56/400.12 |
| 3,095,682 | 7/1963 | Pasquine | 56/400.12 |
| 3,264,809 | 8/1966 | Jackson | 56/400.12 |
| 3,350,866 | 11/1967 | Spencer | 56/400.12 |
| 3,617,084 | 11/1971 | Mares | 294/50.6 |
| 3,654,754 | 4/1972 | Scoggin, Jr. et al. | 56/400.17 |
| 3,688,484 | 9/1972 | Cox | 56/400.12 |
| 3,724,188 | 4/1973 | Eads | 56/400.17 |
| 4,037,397 | 7/1977 | Florentino | 56/400.12 |

FOREIGN PATENT DOCUMENTS 1253012 11/1971 United Kingdom ............. 56/400.12

Primary Examiner—Paul J. Hirsch
Attorney, Agent, or Firm—Zarley, McKee, Thomte, Voorhees & Sease

[57] ABSTRACT

A pair of rakes are pivotally interconnected to gather and transport leaf material. Blades are provided on the lower ends of the rakes which are identical in shape but facing in opposite directions. Sleeves for the handles are offset from the vertical centerline of the blades allowing for the adjacent blade ends to be coplanar. The teeth may abut against each other at their lower ends in the closed position or intermesh in registering relationship.

4 Claims, 3 Drawing Sheets

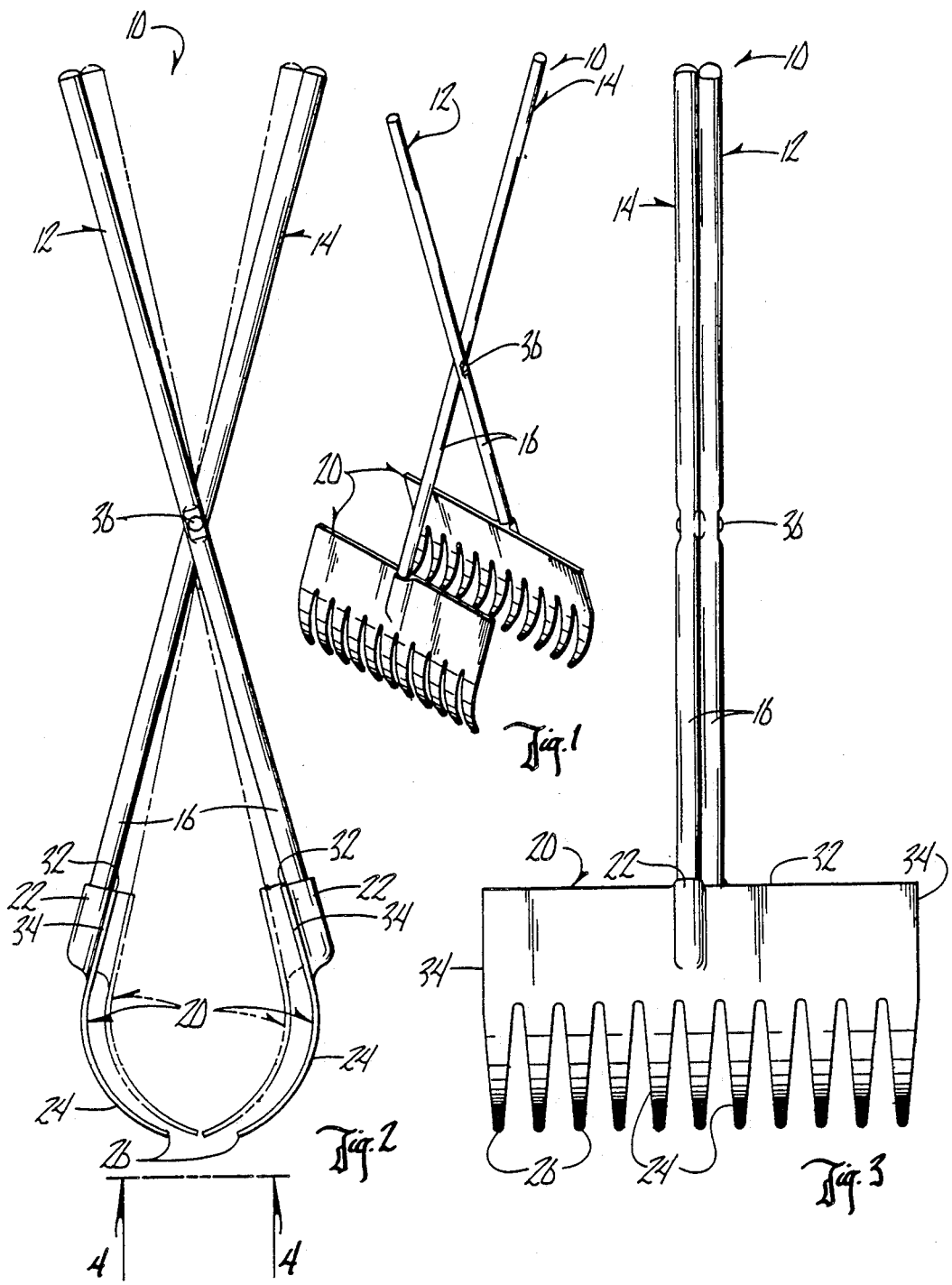

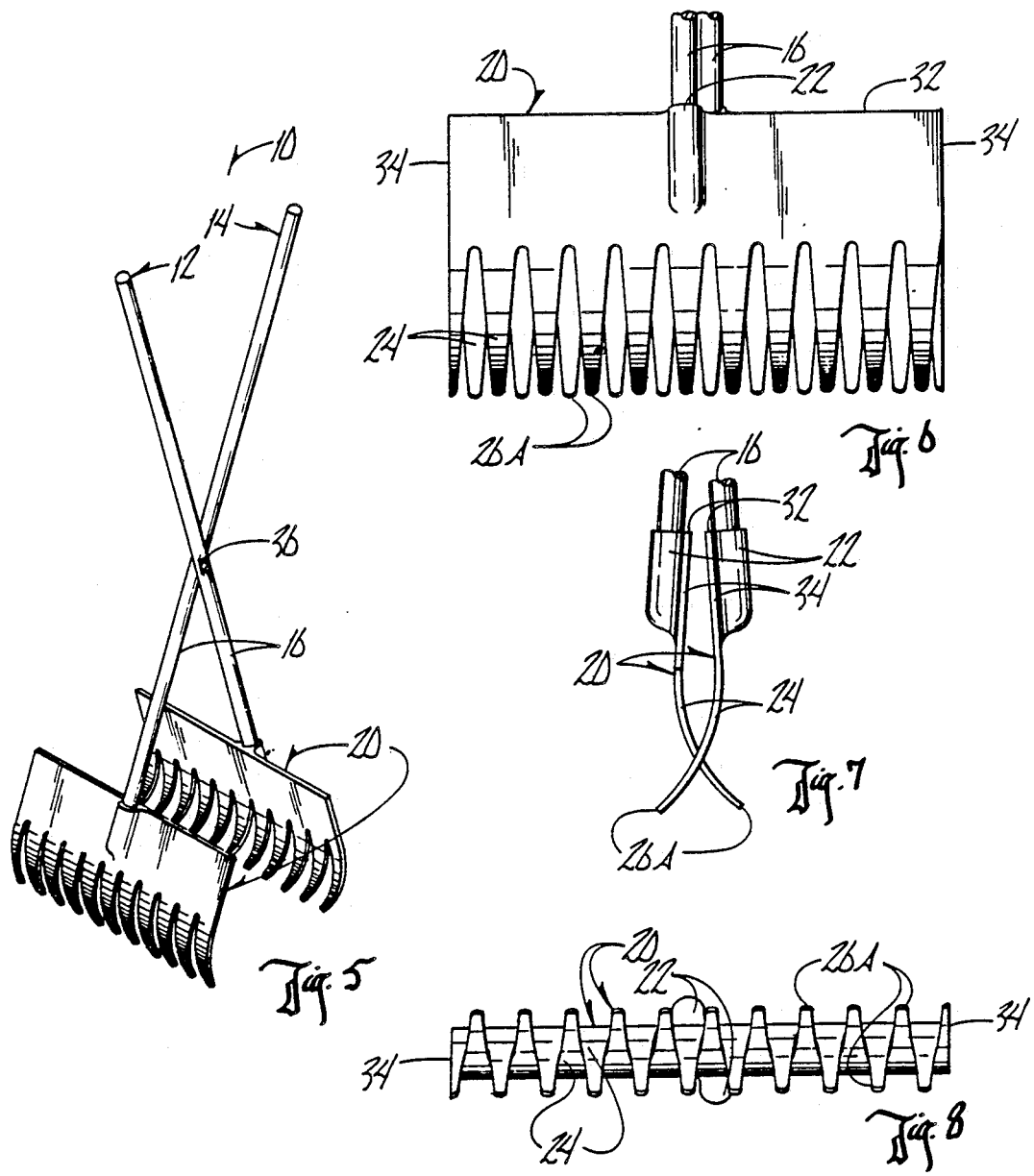

4,991,386

COMBINATION LEAF CADDY AND PICKUP TOOL

BACKGROUND OF THE INVENTION

Lawn rakes of the spring teeth type are shown in U.S. Pat. No. 4,037,397 and 3,688,484 wherein a pair of rakes are pivotally interconnected. The rake heads are curved along their lower edges such that leaves carried between the rakes cannot fall easily from either opposite end as they will catch on the right angle teeth end portions. The spring teeth are easily deformed out of the plane of the rake head and thus interfere with removal of raked material.

In the '397 patent the handle of one rake extends through the center of the handle of the other rake to maintain the heads in alignment. In the '484 patent the handles have flattened surfaces where they are pivotally interconnected to help position the heads as closely as possible in alignment.

A leaf caddy and pickup tool is needed that is easily manufactured by molding from plastic utilizing a common head for each rake but allowing for the rake heads to be aligned.

SUMMARY OF THE INVENTION

Each rake head blade of this invention is produced from the same mold. The handle sleeves on the back of the blade are offset from the vertical centerline such that when the blades are facing each other the interface between the sleeves is on the centerline. The handles received in the sleeves may be pivotally interconnected without flattening abutting surfaces for the purpose of aligning the rake heads since this is accounted for in the offset sleeves of the rake heads.

The molded plastic sheet material has a smooth surface from top to bottom and end to end along the transverse axis such that leaf material will slide smoothly from between the rake heads when the heads are positioned for emptying the leaves therefrom. A chute-like passageway is provided therebetween which offers no resistance through the teeth which are maintained coplanar at all times due to their being formed from a flat sheet of material rather than individually formed as in a spring-type rake.

The rake heads are rectangular in shape with straight top and bottom edges and opposite end edges thereby defining a cylindrical like chute passageway therebetween. There is enough curve in the rake head blades to gather and hold leaf material but not to interfere with its smooth flow transversely through the passageway formed by the opposing rake heads.

DESCRIPTION OF THE DRAWINGS

FIG. 1 is a perspective view of the combination leaf caddy and pickup tool.

FIG. 2 is an enlarged end elevational view thereof showing the tool in its closed and opened positions.

FIG. 3 is a side elevational view thereof.

FIG. 4 is a bottom end view taken along line 4—4 in FIG. 2.

FIG. 5 is a view similar to FIG. 1 but showing an alternate embodiment wherein the teeth are intermeshed in registering relationship.

FIG. 6 is a fragmentary side elevational view thereof.

FIG. 7 is a fragmentary end elevational view thereof.

FIG. 8 is a bottom view thereof.

DESCRIPTION OF THE PREFERRED EMBODIMENT

Figure 9:
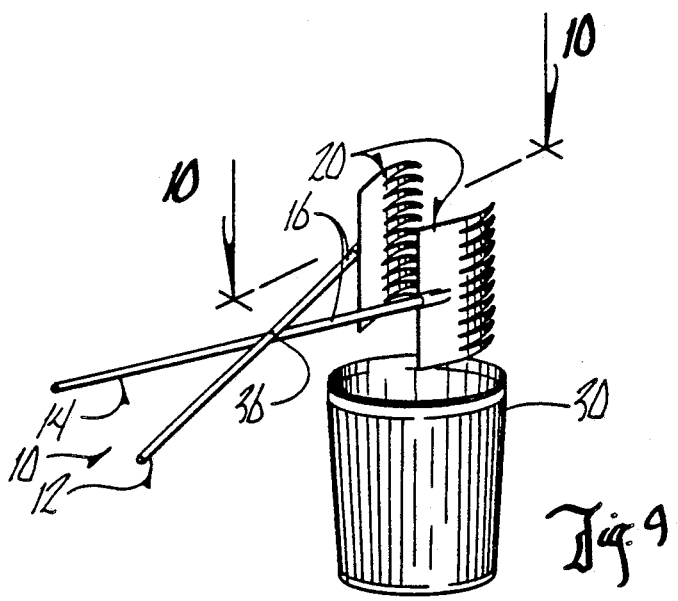
FIG. 9 is a view showing the rake in position for emptying leaves into a collection container.

The combination leaf caddy and pickup tool of this invention is shown in FIG. 1 and referred to generally by the reference numeral 10. It includes a pair of rakes 12 and 14. Each rake has an elongated handle 16 and a blade head 20.

Each of the blade heads 20 are of plastic sheet material molded identically in shape such that a single mold is required to produce each rake head. As seen in FIG. 3, sleeves 22 are provided on the back surfaces of the rake heads and are offset from a vertical centerline. The rake heads 20 are in alignment with each other such that the individual teeth 24 engage each other at their tip ends 26, as seen in FIG. 2, when the rake heads are in their closed position, as shown by the dash lines.

Figure 10:
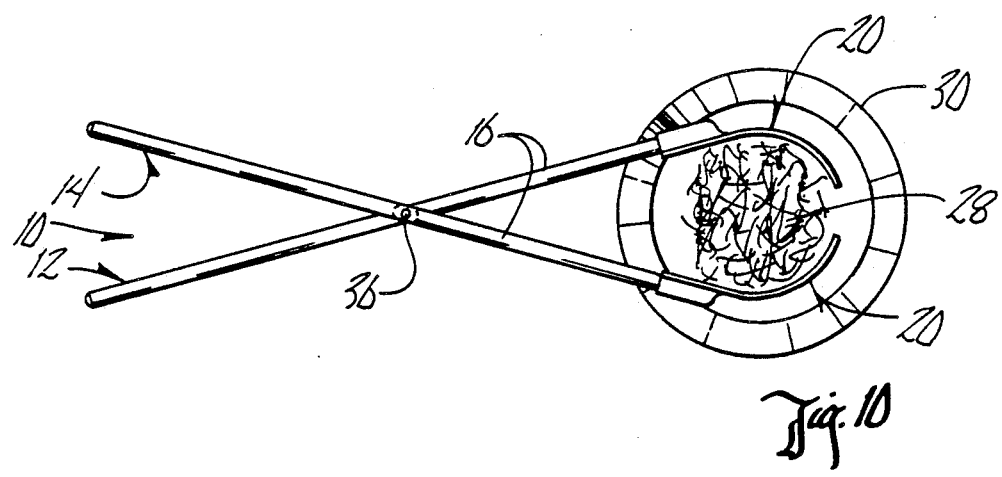
FIG. 10 is a view taken along line 10—10 in FIG. 9.

The teeth 24 have a smooth continuous curve along their length which define a cylindrical-like chute passageway therebetween through which leaf material 28 flows when being emptied into a container 30, as seen in FIG. 10, when the rake heads are positioned with their transverse axes in a vertical plane. The teeth remain coplanar throughout use since they are formed from the sheet material rather than being individually constructed as in a spring tooth type rake head. The rake heads are also seen to be rectangular in shape with a straight top edge 32 and opposite end edges 34. The teeth all terminate in a straight line parallel to the top edge 32.

The handles 16 are cylindrical in cross section and have smooth abutting surfaces where they are pivotally interconnected by a bolt 36.

In FIGS. 5-8 a second embodiment is shown which differs only in that the teeth 26A, rather than being in direct opposing aligned relationship, are intermeshed in registering relationship as seen in FIGS. 6 and 8. The sleeves 22 are offset from the centerline in a similar fashion allowing for a single mold to produce both rake heads thereby minimizing costs of production and inventory.

Thus it is seen in operation that leaves may be gathered together by spreading the rake heads apart and then closing them about the leaves. The leaves may then be carried to a collection container 30 with the rake heads being turned on end and spread apart allowing the leaves 28 to smoothly fall from between the rake heads along the smooth chute-like surfaces.

I claim:

1. A combination leaf caddy and pickup tool, comprising, oppositely disposed pivotably interconnected first and second rakes each having a handle with a jaw of sheet material connected at one end, said jaws being of plastic material and identical in shape but positioned in opposing relationship to each other, each of said jaws having upper and lower sections having a substantially uniform thickness throughout the area of each, said upper section being substantially flat and solid and merging smoothly into said lower section, said lower section including a plurality of curved teeth extending towards the teeth of the other rake, said first and second rakes being pivotal between open and closed positions with the teeth of each rake being in engagement with the teeth of the other rake when in said closed position, said jaws having a rectangular shape including straight end and top and bottom edges and when in said closed position defining a cylindrical-like transverse passageway between said jaws which allows for emptying leaf material from either end when the transverse axis of said passageway is vertically positioned, said teeth having a width throughout their length greater than their thickness, and a handle mounting means on entirely the back side of each of said jaws at the upper edge of the top section to provide an uninterrupted smooth front surface on said jaws for gathered material to freely flow from said passageway when in said vertical position.

2. The structure of claim 1 wherein said teeth on opposing jaws are coplanar and abut each other without overlapping at their lower tip ends when in said closed position.

3. The structure of claim 1 wherein said teeth on opposing jaws are offset from each other and intermesh in registering relationship when in said closed position.

4. The structure of claim 1 wherein said mounting means on said jaws are sleeves integral with said jaws and are of molded plastic material.

* * * * *